United States Patent
Dempel et al.

(10) Patent No.: US 11,084,368 B2
(45) Date of Patent: Aug. 10, 2021

(54) TRANSMISSION FOR A HYBRID DRIVE ARRANGEMENT, HYBRID DRIVE ARRANGEMENT, VEHICLE, METHOD FOR OPERATING THE HYBRID DRIVE ARRANGEMENT, COMPUTER PROGRAM AND STORAGE MEDIUM

(71) Applicant: Robert Bosch GmbH, Stuttgart (DE)

(72) Inventors: Rolf Lucius Dempel, Besigheim (DE); Dominik Eszterle, Heilbronn (DE); Thomas Huber, Daisbach (DE); Christian Wirth, Eichenried (DE); Simon Brummer, Gröbenzell (DE); Tom Smejkal, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/636,059

(22) PCT Filed: Jul. 31, 2018

(86) PCT No.: PCT/EP2018/070689
§ 371 (c)(1),
(2) Date: Feb. 3, 2020

(87) PCT Pub. No.: WO2019/025420
PCT Pub. Date: Feb. 7, 2019

(65) Prior Publication Data
US 2021/0162851 A1    Jun. 3, 2021

(30) Foreign Application Priority Data
Aug. 2, 2017  (DE) .................... 10 2017 213 385.6

(51) Int. Cl.
*B60K 6/365*    (2007.10)
*F16H 3/66*    (2006.01)
(Continued)

(52) U.S. Cl.
CPC ................ *B60K 6/365* (2013.01); *B60K 6/48* (2013.01); *B60K 6/547* (2013.01); *F16H 3/66* (2013.01);
(Continued)

(58) Field of Classification Search
None
See application file for complete search history.

(56) References Cited

U.S. PATENT DOCUMENTS 7,232,393 B2 *  6/2007  Bucknor ................ B60L 50/61
                                                        475/5
7,288,041 B2 * 10/2007  Bucknor ................ B60K 6/365
                                                        475/151
(Continued)

FOREIGN PATENT DOCUMENTS

DE    102008044101    6/2010
DE    102011056167   12/2012
(Continued)

OTHER PUBLICATIONS

International Search Report for Application No. PCT/EP2018/070689 dated Oct. 26, 2018 (English Translation, 2 pages).

*Primary Examiner* — Dirk Wright
(74) *Attorney, Agent, or Firm* — Michael Best & Friedrich LLP

(57) ABSTRACT

The invention relates to a transmission (100) for a hybrid drive arrangement which can be coupled to two drive assemblies (7, 8) for operating the hybrid drive arrangement, comprising an input shaft (10), and an output shaft (11), at least one first and one second shifting element (SE1, SE2), and at least one first and one second planetary gear (5,6). The input shaft (10) can be coupled to the sun gear of the first planetary gear (5) by means of the first shifting element (SE1) and is coupled to the sun gear of the second planetary gear (6). The input shaft (10) can be coupled to planet carrier of the first planetary gear (5) by means of the second shifting
(Continued)

element (SE2) which is coupled to the ring gear of the second planetary carrier (6). The output shaft (11) can be coupled to the planet carrier of the second planetary gear (6).

17 Claims, 3 Drawing Sheets

(51) Int. Cl.
    *B60K 6/547*     (2007.10)
    *B60K 6/48*     (2007.10)
    *F16H 3/44*     (2006.01)

(52) U.S. Cl.
    CPC ............... *B60K 2006/4816* (2013.01); *B60Y 2200/92* (2013.01); *F16H 2003/445* (2013.01); *F16H 2200/0056* (2013.01); *F16H 2200/2007* (2013.01); *F16H 2200/2041* (2013.01)

(56) References Cited

U.S. PATENT DOCUMENTS

| | | | |
|---|---|---|---|
| 8,449,420 B2 * | 5/2013 | Seo ................... | F16H 3/728 475/5 |
| 9,376,007 B2 * | 6/2016 | Kim ................... | B60K 6/445 |
| 10,571,002 B1 * | 2/2020 | Park ................... | F16H 37/042 |

FOREIGN PATENT DOCUMENTS

| | | | | |
|---|---|---|---|---|
| DE | 102014204009 | | 9/2015 | |
| DE | 102015209294 | | 11/2016 | |
| EP | 3095631 | A1 * | 11/2016 | ............ B60K 6/547 |
| WO | 2010009943 | | 1/2010 | |

* cited by examiner

|     | SE1 | SE2 | SE3 | SE4 | i   |
|-----|-----|-----|-----|-----|-----|
| G1  | x   |     |     | x   | 11  |
| G2  | x   |     | x   |     | 6   |
| G3  | x   | x   |     |     | 3   |
| G4  |     | x   | x   |     | 2   |
| E1  |     |     |     | x   | -11 |
| E2  |     |     | x   |     | -6  |
| eCVT|     | x   |     |     |     |
| CH  | x   |     |     |     |     |

TRANSMISSION FOR A HYBRID DRIVE ARRANGEMENT, HYBRID DRIVE ARRANGEMENT, VEHICLE, METHOD FOR OPERATING THE HYBRID DRIVE ARRANGEMENT, COMPUTER PROGRAM AND STORAGE MEDIUM

BACKGROUND OF THE INVENTION

The invention relates to a transmission for a hybrid drive arrangement. Furthermore, the invention relates to a hybrid drive arrangement having a transmission, to a vehicle having a hybrid drive arrangement, and to a method for operating the hybrid drive arrangement, and to a computer program and a machine-readable storage medium.

Transmissions for hybrid drive arrangements are known from the prior art. For example, WO2010/009943 A1 discloses a double clutch transmission which makes the operation of a hybrid vehicle possible by way of internal combustion engine, by way of electric motor, and by way of the two drive units together. Transmissions of this type are complex, heavy and expensive. There is a requirement for transmission topologies with a reduced mechanical complexity, a decreased installation space requirement and a reduced weight.

In the following text, the term "coupled" or "attached" is used in the sense of a fixed connection. In contrast to this, the term "can be coupled" comprises both fixed and switchable connections within the context of the present description. If a switchable connection is specifically meant, the corresponding shifting element is as a rule specified explicitly, in particular a brake or a clutch. If, in contrast, a fixed, rigid or non-rotating connection is specifically meant, the term "coupled" or "attached" is as a rule used and the use of the term "can be coupled" is dispensed with. The use of the term "can be coupled" without specification of a specific shifting element therefore indicates the intentional inclusion of the two types. This distinction takes place solely for the benefit of improved comprehensibility and, in particular, in order to clarify where the provision of a switchable connection instead of a fixed connection or coupling which can as a rule be realized more easily is absolutely necessary. The above definition of the term "coupled" or "attached" is therefore in no way to be interpreted to be so narrow that couplings which are inserted arbitrarily for bypassing purposes are derived from its literal sense.

SUMMARY OF THE INVENTION

A transmission for a hybrid drive arrangement is provided, which transmission can be coupled to two drive units, having an input shaft and an output shaft, at least a first and a second shifting element, and at least a first and a second planetary transmission, it being possible for the input shaft to be coupled by means of the first shifting element to the sun gear of the first planetary transmission which is coupled to the sun gear of the second planetary transmission, and it being possible for the input shaft to be coupled by means of the second shifting element to the planetary carrier of the first planetary transmission which is coupled to the internal gear of the second planetary transmission, and the output shaft being coupled to the planetary carrier of the second planetary transmission.

A transmission for a hybrid drive arrangement is provided. For the operation of the hybrid drive arrangement, two drive units can be coupled to the transmission. The transmission comprises an input shaft and an output shaft, at least a first and a second shifting element, and at least a first and a second planetary transmission. The input shaft is fixedly coupled to the first shifting element and thus is connected in a non-rotatable manner. Within the context of the description, a coupling is thus a connection which is configured rigidly, for example in one piece, for example by means of a shaft, or with a fixed transmission or transmission stage. Furthermore, the input shaft can be coupled by means of closing of the first shifting element to the sun gear of the first planetary transmission. The sun gear of the first planetary transmission is coupled to the sun gear of the second planetary transmission. Furthermore, the input shaft is coupled to the second shifting element and by means of closing of the second shifting element can be coupled to the planetary carrier of the first planetary transmission. The planetary carrier of the first planetary transmission is coupled to the internal gear of the second planetary transmission. The output shaft is coupled to the planetary carrier of the second planetary transmission. In particular, the output shaft can be coupled to an output. The output is, in particular, a shaft or an axle which transmits the movement of the output shaft to the mechanical drive train of a vehicle, for example to a differential or to a drive wheel. A transmission is advantageously provided which transmits the rotational speed and the torque which prevails at the input shaft to the output shaft in accordance with the transmission ratios in the transmission in the case of a closed first and second shifting element.

In another refinement of the invention, the transmission comprises a third shifting element which is set up to brake or to release the internal gear of the first planetary transmission.

A third shifting element is provided for the transmission, which third shifting element makes releasing or braking of the internal gear of the first planetary transmission possible, in particular connecting of the internal gear or supporting of the internal gear on a fixed point or on a housing of the transmission. The braking of the internal gear comprises the reduction of the rotational speed of the internal gear, in particular to a standstill of the internal gear. The releasing of the internal gear comprises the releasing of the brake, with the result that the internal gear accelerates in accordance with the forces which act on the internal gear. In addition to the abovementioned operating modes, further operating modes can advantageously be set by way of the above-described topology of the transmission with the first, second and third shifting elements. A further transmission ratio between the input shaft and the output shaft thus results in the case of a closed first shifting element, an open second shifting element and a closed third shifting element. A third transmission ratio for the operation of the transmission results in the case of an open first shifting element, a closed second shifting element and a closed third shifting element. The input shaft is decoupled from the output shaft in the case of an open first and second shifting element.

In another refinement of the invention, the transmission comprises a fourth shifting element which is set up to brake or to release the internal gear of the second planetary transmission.

A fourth shifting element is provided which can release or brake the internal gear of the second planetary transmission, in particular can connect or couple the internal gear to a fixed point or the housing, or can support the internal gear on the housing. The braking of the internal gear comprises the reduction of the rotational speed of the internal gear, in particular as far as the standstill of the internal gear. The releasing of the internal gear comprises the disengaging of the brake, with the result that the internal gear accelerates in accordance with the forces which act on the internal gear. In addition to the abovementioned operating modes, further operating modes can advantageously be set with the above-described topology of the transmission by way of the first, second, third and fourth shifting element. A fourth transmission ratio between the input shaft and the output shaft thus advantageously results in the case of closing of the first and the fourth shifting element and opening of the second and the third shifting element. The input shaft is decoupled from the output shaft in the case of an open first and second shifting element.

In a further refinement of the invention, the first and/or the second shifting element comprise/comprises a clutch. In order to connect the input shaft to the aforementioned components of the planetary transmission, the first and/or the second shifting element are/is configured as a clutch. A clutch of this type can be, in particular, a dry clutch, a wet clutch or a claw coupling. Possibilities for a controllable connection of the input shaft to the components of the planetary transmission are advantageously provided.

In another refinement of the invention, the third and/or the fourth shifting element comprises a brake.

The third and/or the fourth shifting element are/is configured as a brake, in particular as a dry brake or wet brake or as a claw coupling. A possibility for controllably releasing and braking the internal gears of the first or of the second planetary transmission is advantageously provided.

In another refinement of the invention, a first drive unit, in particular an internal combustion engine, can be coupled to the input shaft, and/or a second drive unit, in particular an electric machine, can be coupled to the sun gear of the first planetary transmission and to the sun gear of the second planetary transmission.

The first drive unit can be attached on the input shaft on the input side. The second drive unit can be coupled to the sun gear of the first planetary transmission and to the sun gear of the second planetary transmission. For generator operation of the second drive unit, for example an electric machine, for example in order to charge a battery, the first drive unit or the internal combustion engine can advantageously be connected to the electric machine by means of closing of the first shifting element and opening of the second, third and fourth shifting element. Since the two drive units are decoupled here from the output shaft and therefore no torque is transmitted to the output shaft, said charging can take place in the case of an output shaft which is at a standstill, for example, that is to say, for example, during the standstill of a vehicle. In the case of an output shaft which is, for example, at a standstill, a direct transmission of the rotational energy of the first drive unit to the second drive unit or vice versa is made possible.

Power-split operation of the transmission (eCVT mode) is made possible by way of closing of the second shifting element and opening of the first, third and fourth shifting element. Here, the first drive unit and the electric machine act on the second planetary transmission which is connected to the output shaft. Here, the transmission ratio between the input shaft and the output shaft can be varied continuously over a wide range by means of specification of a rotational speed or a torque of the second drive unit. Power-split operation (also called eCVT mode) is advantageously made possible, in the case of which both the propulsion power at the output shaft and the charging power for the generator operation of the electric machine can be set independently of one another. Charging at a standstill or in crawling mode (>0 km/h to approximately 10 km/h) and a smooth comfortable transition from the standstill charging mode into the crawling charging mode and the driving mode is advantageously made possible with a fixed transmission, that is to say in a fixed gear.

In the case of an open first and second shifting element, the input shaft and therefore the first drive unit are decoupled from the output shaft. In the case of an additionally closed third shifting element, the second drive unit is connected via a first transmission ratio to the output shaft, with the result that driving of the output shaft can take place only by means of the second drive unit. In the case of an open third shifting element and a closed fourth shifting element, the second drive unit is coupled via a second transmission ratio to the output shaft. This is a second transmission ratio for sole drive by means of the second drive unit. By means of (in particular, metered) closing of the first shifting element, the first drive unit can be driven and, for example, can be started if the first drive unit is an internal combustion engine while driving by means of the second drive unit.

There is also the possibility that the first drive unit is configured, for example, as an electric machine, and the second drive unit is configured, for example, as an internal combustion engine. In a configuration of this type, different functionalities and operating modes for the interaction of the components can result by means of the transmission, which are not described further here.

In another refinement of the invention, the transmission ratios of the transmission are changed without the traction force being interrupted.

Changing of the transmission ratios of the transmission, in particular shifting into another gear or into another operating mode of the transmission, takes place without the traction force being interrupted if, in particular, for the change from one operating mode of the transmission into another, one of the shifting elements retains its state, a second one of the shifting elements is transferred from a closed state into an open state, and a third one of the shifting elements is transferred from an open state into a closed state. A transmission is advantageously provided, in the case of which changing of the gear stages without an interruption of the traction force is made possible.

In another refinement of the invention, the transmission comprises an actuator for actuating at least one of the shifting elements in a manner which is dependent on a predefined operating specification signal.

An actuator is provided which actuates at least one of the shifting elements in a manner which is dependent on a predefined operating specification signal, for example a requested torque, a predefined rotational speed, or a defined operating point of the drive unit. Said parameters of the operating specification signal can be related to the output shaft of the transmission, to the input shaft, or to the shafts which are to be connected to the drive units. Control of the transmission is advantageously made possible.

Furthermore, the invention relates to a hybrid drive arrangement having a transmission, the hybrid drive arrangement comprising a second drive assembly (8) and/or a pulse inverter (60), an electric energy source (70) or a first drive unit (7).

A hybrid drive arrangement having an above-described transmission is provided. The hybrid drive arrangement comprises a second drive assembly. In particular, the hybrid drive arrangement comprises a pulse inverter, an electric energy source and/or a first drive unit. The second drive unit is coupled or connected, in particular, to the sun gears of the planetary transmission. The pulse inverter is provided, in particular, for supplying the second drive unit, in particular an electric machine. To this end, in particular, it converts the electric energy of an electric energy source, for example a battery and/or a fuel cell. The first drive unit is coupled or connected, in particular, to the input shaft. A hybrid drive arrangement which is set up for use in a vehicle is advantageously provided.

Furthermore, the invention comprises a vehicle having a described hybrid drive arrangement. A vehicle which comprises a hybrid drive arrangement is advantageously provided.

Furthermore, the invention comprises a method for operating a hybrid drive arrangement having a transmission. The method comprises the following steps:

determining of an operating specification signal;

actuating of at least one of the shifting elements in order to set the functionality of the transmission in a manner which is dependent on the operating specification signal (BV).

A method for operating a hybrid drive arrangement having a transmission is provided. Here, an operating specification signal is determined. At least one of the shifting elements is closed or opened in order to set the functionality of the transmission or of a corresponding operating mode in a manner which is dependent on the operating specification signal. The operating specification signal is predefined in a manner which is dependent on an operating strategy, a driver request or accelerator pedal, a battery management system or other systems which are available, for example, in a vehicle. In a manner which is dependent on said operating specification signal, the shifting elements are actuated in order to set the corresponding functionality or the operating mode of the transmission, in particular the clutches or brakes are closed or opened. The functionality of the transmission or the operating mode are, in particular, the different transmission ratios of the various gear stages, or the various modes or operating modes, for example generator operation of the second drive unit in the case of a stationary output shaft or the eCVT mode. A method for operating a hybrid drive arrangement is advantageously provided.

Furthermore, the invention relates to a computer program which is set up to carry out the described method.

Furthermore, the invention relates to a machine-readable storage medium, on which the described computer program is stored.

BRIEF DESCRIPTION OF THE DRAWINGS

It goes without saying that the features, properties and advantages of the transmission relate and/or can be applied accordingly to the hybrid drive arrangement, the vehicle and/or the method, and vice versa. Further features and advantages of embodiments of the invention result from the following description with reference to the appended drawings.

In the following text, the invention is to be described in greater detail on the basis of some figures, in which.

DETAILED DESCRIPTION

Figure 1:
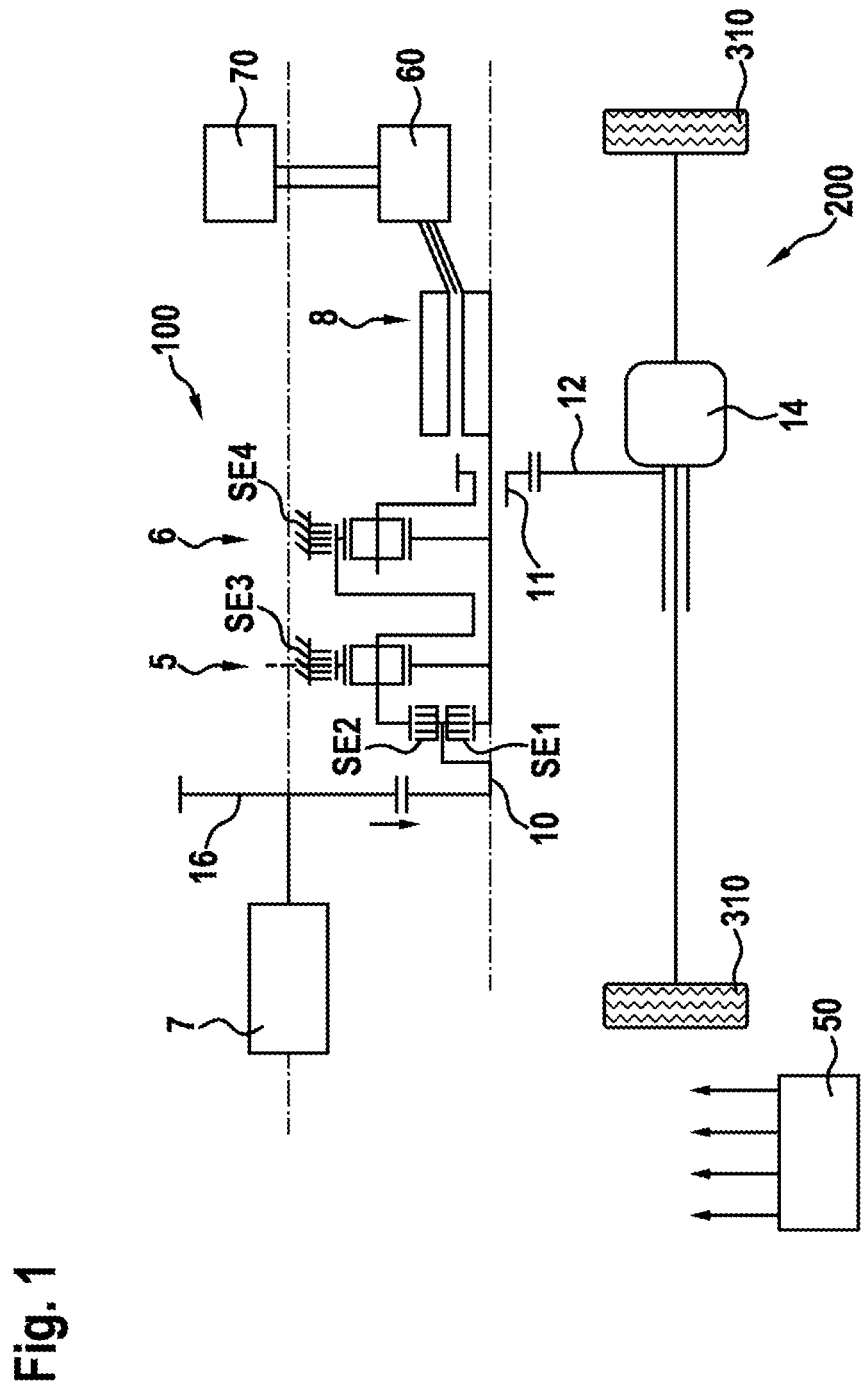
FIG. 1 shows a diagrammatic illustration of the hybrid drive train arrangement having a transmission.

FIG. 1 shows a hybrid drive train arrangement 200 having a first drive unit 7, in particular an internal combustion engine, and a second drive unit 8, in particular an electric machine, and a transmission 100. In particular, the hybrid drive train arrangement comprises a pulse inverter 60 for supplying the second drive unit 8 with electric energy. Furthermore, the hybrid drive train arrangement 200 comprises, in particular, an electric energy source 70 which is connected to the pulse inverter 60. The transmission 100 comprises the input shaft 10 and the output shaft 11. Furthermore, the transmission 100 comprises a first planetary transmission 5 and a second planetary transmission 6. Furthermore, the transmission 100 comprises a first shifting element SE1 and a second shifting element SE2. The first shifting element SE1, in particular a clutch, is set up to connect or to disconnect the input shaft 10 to/from the sun gears of the first and of the second planetary transmission 5, 6. The second shifting element SE2, in particular a clutch, is set up to connect or to disconnect the input shaft 10 to/from the planetary carrier of the first planetary transmission 5 and to/from the internal gear of the second planetary transmission 6. Furthermore, the transmission 100 can comprise a third shifting element SE3 and a fourth shifting element SE4. The third shifting element SE3, in particular a brake, is set up to release or to brake the internal gear of the first planetary transmission 5, in particular by the brake connecting the internal gear to a fixed point or, for example, supporting it on the housing (not shown) of the transmission 100. The shifting element SE4, in particular a brake, is set up to release or to brake the internal gear of the second planetary transmission 6, in particular by the brake connecting the internal gear to a fixed point or, for example, supporting it on the housing (not shown) of the transmission 100. Furthermore, the transmission is set up to be coupled or connected to a first drive unit 7 via the input shaft 10 for operation. To this end, FIG. 1 shows that the shaft of the drive unit 7 is connected to the input shaft 10 via a spur gear set. The second drive unit 8, in particular an electric machine, is coupled or connected to the sun gears of the planetary transmissions 5 and 6 and to the shifting element 1 for the operation of the transmission 100, as shown in FIG. 1. For an optimization of the transmission ratios, the output shaft 11 is connected, for example, to a differential 14, for example via an output 12, in particular a spur gear set, via which differential 14 the movements are transmitted to the wheels 310. An actuator 50 is provided for actuating the shifting elements, which actuator 50 carries out the method for operating the hybrid drive arrangement having the transmission. The control lines between the actuator 50 and the shifting elements SE1 . . . SE4 are indicated by means of the arrows on the actuator 50. Said control lines are not illustrated completely for improved presentation purposes. The communication between the shifting elements and the apparatus can, however, take place also by means of a bus system or in a wireless manner.

Figures 2, 3:
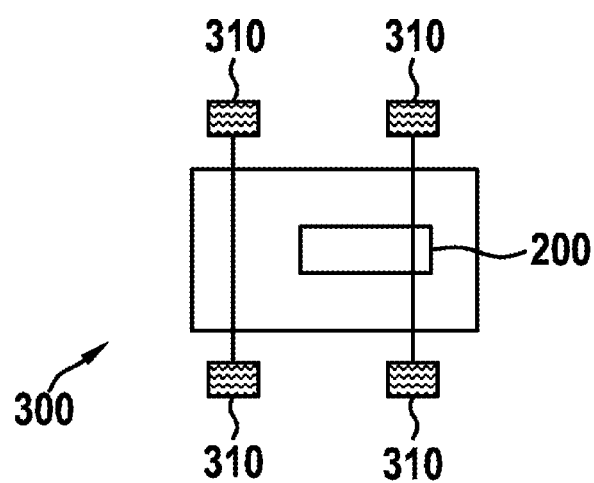
FIG. 2 shows a shifting matrix of the transmission.
FIG. 3 shows a diagrammatically illustrated vehicle having a hybrid drive train arrangement.

FIG. 2 shows a shifting matrix of the transmission. The individual shifting elements SE1 . . . SE4 are indicated in the columns, and an approximate transmission ratio which results between the input shaft and the output shaft is shown in the last column by way of example. The different gear stages, gears or operating modes of the transmission are indicated in the rows. Crosses in the shifting matrix show which of the shifting elements have to be activated, in order that the corresponding gear or operating mode is set. Here, activation of the shifting elements means, in particular, that a clutch is closed or a brake is actuated, with the result that a force can be transmitted via the clutch from one shaft to a further shaft and a force can be transmitted by means of the brake to a fixed point, in particular the transmission housing.

It can be seen from the shifting matrix that, depending on the combination of the four shifting elements, four gears G1 . . . G4 can be set, the first gear G1 having the highest transmission ratio and the fourth gear G4 having the lowest transmission ratio. In the case of said gears, there is a fixed rotational speed ratio between the input shaft and the output shaft in accordance with the transmission ratio, and a first and second drive unit drive the output shaft 11 either in each case individually or together. In particular, these are internal combustion engine or hybrid gears, for example if the drive unit is an internal combustion engine and the second drive unit is an electric machine. Said gears also make it possible to raise the load point of the internal combustion engine, with the result that the electric machine can be operated as a generator, and charging of a battery can take place during operation, in particular driving operation of a vehicle. The gears E1 and E2 or operating modes, in which only the second drive unit is connected to the output shaft 11, are also shown in the following lines of the matrix. To this end, in particular, the first and the second shifting element has to be open, in order that there is no connection to the first drive unit. These are, in particular, electric motor gears, for example if the second drive unit is an electric machine. A vehicle can advantageously be operated locally without emissions in said gears. Depending on whether the second drive unit is coupled to the output shaft 11 via the second planetary transmission 6 and the fourth shifting element SE4, a high transmission ratio results, or a lower transmission ratio results in the case of a connection of the second drive unit via the first planetary transmission 5 and the shifting element 3, as shown in the last column of the shifting matrix.

Opening of the third and fourth shifting element SE3, SE4 and of the first shifting element SE1 and closing of the second shifting element SE2 results in power-split operation, the eCVT mode which makes a mutually independent propulsion power at the output shaft 11 and charging power of the second drive unit 8 possible. In particular, said operating mode is suitable for hybrid driving off in the case of a low battery charging state, since stepless changing of the transmission ratios and therefore, in particular, stepless acceleration are possible in the case of a simultaneous generator operation of the second drive unit 8.

A further mode CH (also called standstill charging) results if only the first shifting element SE1 is closed and all other three shifting elements SE2 . . . SE4 are open. Here, the drive units 7 and 8 are coupled to one another, there not being a connection to the output shaft 11. In said operating mode, the second drive unit 8 can be driven by means of the first drive unit 7 during the standstill of the output shaft, in particular of a vehicle, in particular can be used in the manner of a generator for charging an electric energy source 70, for example a battery. As an alternative, the first drive unit 7 can also be driven by means of the second drive unit 8, and, for example, an internal combustion engine start or a diagnosis of the internal combustion engine can be carried out if the first drive unit 7 is an internal combustion engine and the second drive unit 8 is an electric machine.

FIG. 3 shows a vehicle 300 with wheels 310, the vehicle comprising a hybrid drive arrangement 200, as described above.

Figure 4:
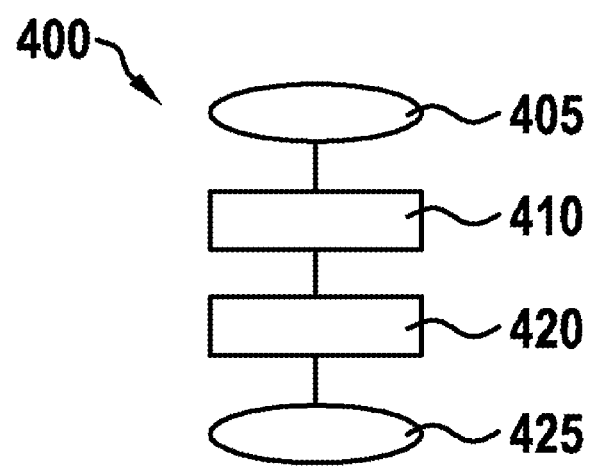
FIG. 4 shows a diagrammatically illustrated method for operating a hybrid drive train arrangement.

FIG. 4 shows a flow chart of a method 400 for operating a hybrid drive arrangement 200 having a transmission 100. The method starts with step 405. In step 410, an operating specification signal BV is determined and, in step 420, at least one of the shifting elements SE1 . . . SE4 is actuated in order to set the functionality of the transmission 100 in a manner which is dependent on the operating specification signal BV. The method ends with step 425. Here, the operating specification signal BV is either a parameter for a physical variable in the transmission 100, such as a torque or a rotational speed or a power output to be transmitted which is to prevail at or to be transmitted to a component of the transmission 100. Said components are, in particular, input shaft 10, output shaft 11, but also the parameters at the drive units 7, 8 or the shifting elements SE1 . . . SE4. Moreover, the operating specification signal BV can also represent a defined operating mode such as one of the four gears G1 . . . G4 or the two gears E1 . . . E2 which are operated only by way of the second drive unit, or else can represent the special functions eCVT or standstill charging CH. In a manner which is dependent on said operating specification signal BV, the shifting elements SE1 . . . SE4 are actuated in accordance with the shifting matrix, in order to shift the transmission 100 into the corresponding gear or operating mode. For a shift between the individual gears or operating modes with no interruption of the tractive force, it is necessary that one of the shifting elements SE1 . . . SE4 retains its state before and after the shifting operation, a further shifting element moving during the shifting from the open into the closed state, whereas another shifting element moves from the closed into the open state.

The invention claimed is:

1. A transmission (100) for a hybrid drive arrangement, the transmission (100) configured to be coupled to two drive units (7, 8), the transmission comprising:
   an input shaft (10) and an output shaft (11),
   at least a first, a second, a third, and a fourth shifting element (SE1, SE2, SE3, SE4), and
   at least a first and a second planetary transmission (5, 6), the transmission further configured to
      couple input shaft (10) via the first shifting element (SE1) to a sun gear of the first planetary transmission (5) which is coupled to a sun gear of the second planetary transmission (6), and
      couple the input shaft (10) via the second shifting element (SE2) to the planetary carrier of the first planetary transmission (5) which is coupled to an internal gear of the second planetary transmission (6), and
      couple the output shaft (11) to the planetary carrier of the second planetary transmission (6),
   wherein the fourth shifting element (SE4) is configured to brake or release the internal gear of the second planetary transmission (6).

2. The transmission as claimed in claim 1,
   wherein the third shifting element (SE3) is configured to brake the internal gear of the first planetary transmission (5).

3. The transmission as claimed in claim 1, wherein the first, and/or the second, or both the first and second shifting elements (SE1, SE2) comprise a clutch.

4. The transmission as claimed in claim 1,
   wherein the third, the fourth, or both the third and fourth shifting elements (SE3, SE4) comprise a brake.

5. The transmission as claimed in claim 1, wherein the transmission is configured to couple an internal combustion engine to the input shaft (10), and to couple an electric machine to the sun gear of the first planetary transmission (5) and to the sun gear of the second planetary transmission (6).

6. The transmission as claimed in claim 1, wherein the transmission is configured to change ratios of the transmission (100) without the traction force being interrupted.

7. The transmission as claimed in claim 1,
further comprising an actuator (50) for actuating at least one of the shifting elements (SE1 ... SE4) in a manner which is dependent on a predefined operating specification signal (BV).

8. A hybrid drive arrangement (200) comprising:
transmission (100) having
an input shaft (10) and an output shaft (11),
at least a first, a second, a third, and a fourth shifting element (SE1, SE2, SE3, SE4), and
at least a first and a second planetary transmission (5, 6),
the transmission configured to
couple input shaft (10) via the first shifting element (SE1) to a sun gear of the first planetary transmission (5) which is coupled to a sun gear of the second planetary transmission (6), and
couple the input shaft (10) via the second shifting element (SE2) to a planetary carrier of the first planetary transmission (5) which is coupled to an internal gear of the second planetary transmission (6), and
couple the output shaft (11) to the planetary carrier of the second planetary transmission (6),
a pulse inverter (60), and
an electric energy source or a first drive unit (7),
wherein the fourth shifting element (SE4) is configured to brake or release the internal gear of the second planetary transmission (6).

9. A vehicle (300) having a hybrid drive arrangement (200) as claimed in claim 8.

10. The hybrid drive arrangement as claimed in claim 8, wherein the third shifting element (SE3) is configured to brake the internal gear of the first planetary transmission (5).

11. The hybrid drive arrangement as claimed in claim 8, wherein the first, and/or the second, or both the first and second shifting elements (SE1, SE2) comprise a clutch.

12. The hybrid drive arrangement as claimed in claim 8, wherein the third, the fourth, or both the third and fourth shifting elements (SE3, SE4) comprise a brake.

13. The hybrid drive arrangement as claimed in claim 8, wherein the transmission is configured to couple an internal combustion engine to the input shaft (10), and to couple an electric machine to sun gear of the first planetary transmission (5) and to sun gear of the second planetary transmission (6).

14. The hybrid drive arrangement as claimed in claim 8, wherein the transmission is configured to change ratios of the transmission (100) without the traction force being interrupted.

15. The hybrid drive arrangement as claimed in claim 8, further comprising an actuator (50) for actuating at least one of the shifting elements (SE1 ... SE4) in a manner which is dependent on a predefined operating specification signal (BV).

16. A method (400) for operating a hybrid drive arrangement (200) having a transmission (100) having
an input shaft (10) and an output shaft (11),
at least a first, a second, a third, and a fourth shifting element (SE1, SE2, SE3, SE4), and
at least a first and a second planetary transmission (5, 6),
the transmission configured to
couple input shaft (10) via the first shifting element (SE1) to a sun gear of the first planetary transmission (5) which is coupled to a sun gear of the second planetary transmission (6), and
couple the input shaft (10) via the second shifting element (SE2) to a planetary carrier of the first planetary transmission (5) which is coupled to an internal gear of the second planetary transmission (6), and
couple the output shaft (11) to the planetary carrier of the second planetary transmission (6),
wherein the fourth shifting element (SE4) is configured to brake or release the internal gear of the second planetary transmission (6),
the method comprising:
determining (410) of an operating specification signal (BV); and
actuating (420) of at least one of the shifting elements (SE1 ... SE4) in order to set the functionality of the transmission (100) in a manner which is dependent on the operating specification signal (BV).

17. A non-transitory, computer-readable storage media, comprising program instructions that when executed by a computer cause the computer to control a transmission that includes
an input shaft (10) and an output shaft (11),
at least a first, a second, a third, and a fourth shifting element (SE1, SE2, SE3, SE4), and
at least a first and a second planetary transmission (5, 6),
the transmission configured to
couple input shaft (10) via the first shifting element (SE1) to a sun gear of the first planetary transmission (5) which is coupled to a sun gear of the second planetary transmission (6), and
couple the input shaft (10) via the second shifting element (SE2) to a planetary carrier of the first planetary transmission (5) which is coupled to an internal gear of the second planetary transmission (6), and
couple the output shaft (11) to the planetary carrier of the second planetary transmission (6),
to
determine (410) an operating specification signal (BV); and
actuate (420) of at least one of the shifting elements (SE1 ... SE4) in order to set the functionality of the transmission (100) in a manner which is dependent on the operating specification signal (BV),
wherein the fourth shifting element (SE4) is configured to brake or release the internal gear of the second planetary transmission (6).

* * * * *